(12) United States Patent
Lumpkin

(10) Patent No.: US 7,013,533 B2
(45) Date of Patent: Mar. 21, 2006

(54) CYCLE GRIP

(75) Inventor: Wayne R. Lumpkin, Littleton, CO (US)

(73) Assignee: SRAM Corporation, Chicago, IL (US)

(*) Notice: Subject to any disclaimer, the term of this patent is extended or adjusted under 35 U.S.C. 154(b) by 153 days.

(21) Appl. No.: 10/679,127

(22) Filed: Oct. 3, 2003

(65) Prior Publication Data

US 2004/0068844 A1 Apr. 15, 2004

Related U.S. Application Data

(60) Provisional application No. 60/416,128, filed on Oct. 4, 2002.

(51) Int. Cl.
*B62K 21/26* (2006.01)

(52) U.S. Cl. .............................. 16/421; 16/431; 16/436; 16/422; 30/340

(58) Field of Classification Search .................. 16/421, 16/430, 436, 422, DIG. 12; 74/551.9; 473/549, 473/551, 568, 298, 300, 303; 15/143.1; 30/340, 30/341, 526; 81/177.1, 489
See application file for complete search history.

(56) References Cited

U.S. PATENT DOCUMENTS

| | | | | |
|---|---|---|---|---|
| 1,218,091 A | * | 3/1917 | Lard | ........................... 473/298 |
| 1,232,816 A | * | 7/1917 | Lard | ........................... 473/298 |
| 1,594,467 A | | 8/1926 | Philbrook | |
| 1,784,780 A | | 12/1930 | Bronson | |
| 2,815,679 A | | 12/1957 | Roberts | |
| 2,975,505 A | | 3/1961 | Linskey et al. | |
| 2,984,486 A | * | 5/1961 | Jones | ........................... 473/568 |
| 4,416,166 A | | 11/1983 | Jannard et al. | |
| 4,466,309 A | * | 8/1984 | Matey | ........................ 74/551.9 |
| 4,535,649 A | | 8/1985 | Stahel | |
| 4,639,029 A | | 1/1987 | Kolonia | |
| 4,837,892 A | | 6/1989 | Lo | |
| 4,843,905 A | | 7/1989 | Jean | |
| 4,893,519 A | | 1/1990 | Corso et al. | |
| 5,125,286 A | | 6/1992 | Wilson | |
| 5,133,101 A | * | 7/1992 | Hauser et al. | ............. 15/143.1 |

(Continued)

FOREIGN PATENT DOCUMENTS

DE 29801916 5/1998

(Continued)

*Primary Examiner*—Robert J. Sandy
*Assistant Examiner*—Michael J Kyle
(74) *Attorney, Agent, or Firm*—Milan Milosevic; Lisa Wunderlich

(57) ABSTRACT

A grip for a cycle includes a cylindrical liner extending along a liner axis between a first and a second end. The cylindrical liner has at least two elongate slots extending axially along a lengthwise portion of the cylindrical liner, each elongate slot overlapping a lengthwise part of another elongate slot, the overlapping elongate slots being radially offset. An over molding overlies a lengthwise of the cylindrical liner. The elongate slots are preferably disposed in a first set of at least two elongate slots extending along a first axial line in the liner and a second set of at least two elongate slots extending along a second axial line in the liner. The first and second axial lines are radially offset and the first set of elongate slots overlaps the second set of elongate slots. A first elongate slot may intercept a first end of the cylindrical liner. A compression member is provided in operative association with a circumference of an axial segment of the cylindrical liner. The axial segment includes at least a lengthwise portion of the first elongate slot. The compression member is operable between a relaxed state not compressing the axial segment and a compression segment compressing the axial segment about its circumference. The axial segment is preferably proximate the first end of the cylindrical liner.

12 Claims, 2 Drawing Sheets

U.S. PATENT DOCUMENTS

| | | | |
|---|---|---|---|
| 5,139,358 A | | 8/1992 | Kodama et al. |
| 5,145,082 A | | 9/1992 | Craft, Jr. et al. |
| 5,259,610 A | * | 11/1993 | Erb .................. 473/568 |
| 5,280,735 A | | 1/1994 | Kuipers et al. |
| 5,342,046 A | * | 8/1994 | Erb .................. 473/568 |
| 5,446,941 A | | 9/1995 | Kelsay |
| 5,494,178 A | * | 2/1996 | Maharg ............. 211/189 |
| 5,579,848 A | | 12/1996 | Hsu |
| 5,595,259 A | | 1/1997 | Gilliland et al. |
| 5,819,594 A | | 10/1998 | Sjovall |
| 5,823,069 A | | 10/1998 | Roark et al. |
| 5,893,297 A | | 4/1999 | Rowe |
| 5,934,154 A | | 8/1999 | Noel |
| 6,035,742 A | | 3/2000 | Hollingsworth et al. |
| 6,108,871 A | | 8/2000 | Weakland et al. |
| 6,173,626 B1 | | 1/2001 | Rowe |
| 6,421,879 B1 | | 7/2002 | Gratz et al. |
| 6,615,688 B1 | | 9/2003 | Wessel |
| 6,658,965 B1 | * | 12/2003 | Allen .................. 74/526 |
| 2001/0010179 A1 | * | 8/2001 | Ku .................. 74/558 |

FOREIGN PATENT DOCUMENTS

| | | |
|---|---|---|
| FR | 394412 | 9/1908 |
| FR | 13763 | 1/1911 |
| JP | 50-02136 A2 | 8/1993 |

* cited by examiner

US 7,013,533 B2

CYCLE GRIP

RELATED APPLICATIONS

This application claims priority from U.S. Provisional Patent Application Ser. No. 60/416,128, filed Oct. 4, 2002, entitled "Bicycle Grip."

TECHNICAL FIELD

The present invention is directed toward grips for the handlebars of a cycle, and more particularly to a grip for a cycle which may be readily and firmly attached to and readily removed from the handlebars of the cycle.

BACKGROUND ART

Cylindrical handlebar grips have been utilized on the ends of handlebars of bicycles and motorcycles (collectively "cycles") for decades. These grips are typically made of a soft polymer that both improves a user's ability to grasp the handlebars of the cycle and cushions the hand against the effect of vibrations and small impacts as the cycle is ridden.

The use of handlebar grips has for many years presented a paradox. The grips are preferably made of anti-skid, relatively elastic and low durometer polymer such as rubber to enhance the graspability and cushioning effects. However, while such grips improve the user's ability to grasp them while on the handlebars, this same property makes it difficult to install the grips onto the handlebars of the cycle. That is, as these cylindrical grips are axially advanced over the ends of the handlebars, there is a high coefficient of friction between the polymer and the handlebars. One manner of dealing with this problem is to lubricate the inner surface of the grip with a volatile lubricant such as hair spray or water. A volatile lubricant is necessary because once the grip is installed on the handlebar, slippage between the grip and the handlebar must be avoided. Adhesives for adhering the grips to the handlebars are generally not acceptable because the grips, being of a low durometer material, wear with time and must be replaced. Use of an adhesive can make it prohibitively difficult to remove the grips. Once the grips are installed, even with the use of a volatile lubricant, they can be difficult to remove when replacement is necessary. Another problem with such conventional grips is that when the cycle is ridden in wet conditions, water can work its way between the inner diameter of the grips and the handlebars causing the grips to slip, thus creating a hazardous situation for the rider. A further problem with these conventional grips is that while the outer diameter of handlebars is generally uniform, there can be variances in the manufacturing tolerances of a tenth of a millimeter or more making it virtually impossible for some grips to adhere adequately to some handlebars or further increasing the difficulty of attaching some grips to some handlebars.

One grip assembly intended to address some of these problems is shown in Grätz, U.S. Pat. No. 6,421,879. Grätz teaches a cylindrical sleeve 1 having a lengthwise slot 3 extending the entire length of the sleeve. Grätz further teaches that a single end clamp 8 can adequately secure the grip. The lengthwise slot in the cylindrical liner allows the grip to accommodate slight variations in the outer diameter of various handlebars. However, it is believed that the lengthwise slot extending the entire length of the sleeve results in the sleeve being subject to torsional deformation or twisting when a torsional force or torque is applied to the grip by a user. Modifying the Grätz structure to provide a clamp at each end of the grip might eliminate the twisting of the grip, but would also increase costs.

The present invention is directed toward overcoming one or more of the problems discussed above.

SUMMARY OF THE INVENTION

A grip for a cycle includes a cylindrical liner extending along a liner axis between a first and a second end. The cylindrical liner has at least two elongate slots extending axially along a lengthwise portion of the cylindrical liner, each elongate slot overlapping a lengthwise part of another elongate slot, the overlapping elongate slots being radially offset. An over molding overlies a lengthwise segment of the cylindrical liner. The elongate slots are preferably disposed in a first set of at least two elongate slots extending along a first axial line in the liner and a second set of at least two elongate slots extending along a second axial line in the liner. The first and second axial lines are radially offset and the first set of elongate slots overlaps the second set of elongate slots. A first elongate slot may intercept a first end of the cylindrical liner. A compression member is provided in operative association with a circumference of an axial segment of the cylindrical liner. The axial segment preferably includes at least a lengthwise segment portion of the first elongate slot. The compression member is operable between a relaxed state not compressing the axial segment and a compression segment compressing the axial segment about its circumference. The axial segment is preferably proximate the first end of the cylindrical liner.

The compression member may include a clamp shroud having an arcuate bottom with an inner radius less than an outer radius of the axial segment. The arcuate bottom overlies the first elongate slot and a band clamp is sized to axially receive the clamp shroud and an exposed portion of the axial segment. The band clamp has a gap between the band clamp ends bridged by a screw threadably engaging one end of the band clamp with the head of the screw abutting the other end of the band clamp. The screw may bias the gap closed when the screw is tightened to produce the compressed state. The clamp shroud preferably extends radially opposite the arcuate bottom to form a slip guard. A cavity may be defined in the slip guard, with the cavity being sized to receive the clamp ends and a head of a screw when the screw is tightened to produce the compressed state.

Another aspect of the present invention is a grip for a cycle handlebar including a cylindrical liner extending along a liner axis between a first end and a second end. The cylindrical liner has a plurality of elongate slots extending axially therein, the plurality of elongate slots being disposed to permit radial expansion of the cylindrical liner upon application of a radial force to the inner diameter of the cylindrical liner. The elongate slots are further disposed to resist torsional shear displacement of the slots that would otherwise be present with a cylindrical liner having a single lengthwise slot, upon application of a torsional force to the cylindrical liner. This also prevents excessive twisting of the grip under torque loads. An elastomer over molding overlies a lengthwise segment of the cylindrical liner. A compression member is operatively associated with a circumference of an axial segment of the cylindrical liner. The axial segment includes at least a lengthwise portion of at least one elongate slot, the compression member being operable between a relaxed state not compressing the axial segment and a compression state compressing the axial segment about its circumference. The compression member may include a clamp shroud having an arcuate bottom with an inner radius less than an outer radius of the axial segment, the arcuate bottom overlying the first elongate slot and a resilient band clamp sized to receive the clamp shroud and an exposed portion of the axial segment. The resilient band clamp is biased to form a gap between the band clamp ends, the band clamp ends being bridged by a screw threadably engaging one end of the band clamp with a head of the screw abutting the other end of the band clamp. The gap between the band ends is biased closed when the screw is tightened to produce the compressed state and the gap is biased open when the screw is loosened to produce the relaxed state.

The grip of a cycle in accordance with the present invention facilitates easy installation and removal of a grip. This further rider comfort and safety by simplifying removal of worn grips and attachment of new grips. Requiring only a single band clamp further simplifies installation and removal and minimizes grip cost. The novel use of a plurality of overlapping elongate slots in the cylindrical liner allows the grip to expand radially if necessary to accommodate over-sized handlebars and to enable securing the grip to a bicycle handlebar by use of a compression member. Further, the novel positioning of multiple elongate slots allows the slots to resist torsional shear displacement and the grip to resist twisting upon application of a torsional force to the cylindrical liner, thus enabling a single compression member to be used to rigidly secure the grip to a bicycle handlebar. All these many advantages are provided by a cycle grip made of conventional materials and which can be easily manufactured. All these many advantages are provide by a cycle grip made of conventional materials and which can be easily manufactured.

DETAILED DESCRIPTION OF THE PREFERRED EMBODIMENT

A cycle grip 10 in accordance with the present invention is shown mounted upon a handlebar 12 of a cycle. The cycle may be any one of a variety of bicycles (e.g., mountain bike, comfort bike, road bike) or a motorcycle. The grip may also be used on a variety of other vehicles such as personal watercraft, scooters, snowmobiles and the like.

Figure 2:
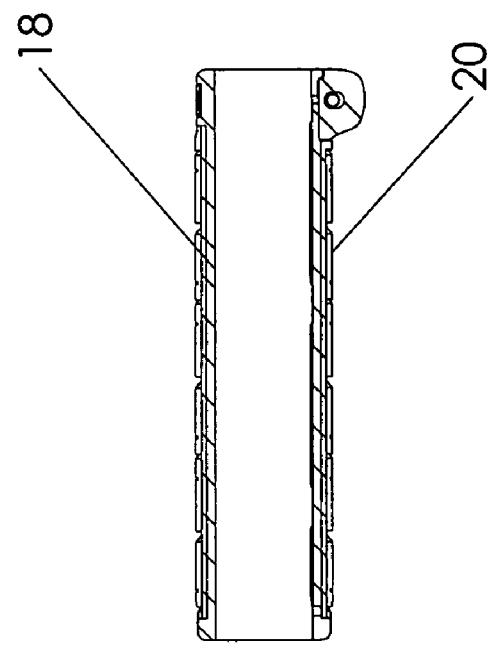
FIG. 2 is a cross-section of the cycle grip taken along line 2—2 of FIG. 1.
Figure 3:
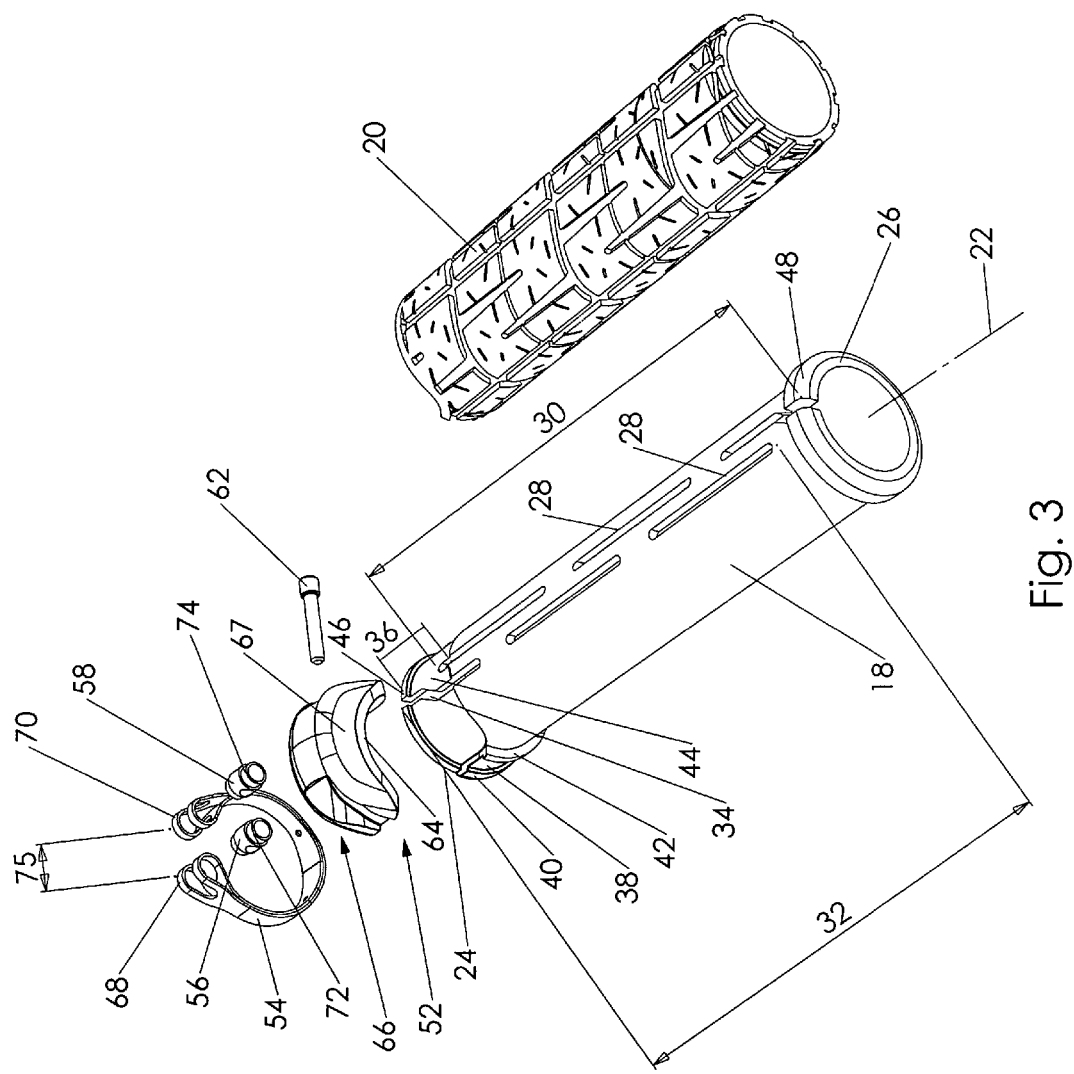
FIG. 3 is an exploded view of the cycle grip of FIG. 1.

The cycle grip 10 consists of a cylindrical body 14 which is fastened to then handlebar 12 by a compression member 16. Referring to FIG. 2, the cylindrical body consists of a cylindrical polymer liner 18 and an over molding elastomer 20. The cylindrical liner 18 is best seen in FIG. 3. The cylindrical liner 18 extends lengthwise along an axis 22 between a first end 24 and a second end 26. A number of elongate slots 28 extend axially along a lengthwise portion of the cylindrical liner 18, with each elongate slot 28 overlapping a lengthwise part of another elongate slot 28. As illustrated in FIG. 3, the elongate slots are disposed with a first set of three elongate slots 30 extending along a first axial line and a second set of three elongate slots 32 extending along a second axial line, with the first and second axial lines being radially offset. The first set of elongate slots 30 overlap the second set of elongate slots 32. A first elongate slot 34 intersects the first end 24 of the cylindrical liner 18.

Adjacent the first end 24 of the cylindrical liner 18 an axial segment 36 of the liner is configured to receive the compression member 16. More particularly, the axial segment 36 includes an arcuate channel 38 defined by a pair of arcuate flanges 40, 42. An arcuate recess 44 is further provided in the axial segment with the first elongate slot 34 axially dividing the arcuate recess 44. An arcuate flange 46 forms an axial boundary of the arcuate recess 44 at the first end 24. Finally, an annular flange 48 is provided at the second end 26 of the cylindrical liner 18. The cylindrical liner 18 is preferably injection molded from a relatively rigid, high durometer polymer. Polyvinylchloride is one suitable polymer for making the liner 18. Alternatively, the liner could be made of other solid, high durometer resilient materials such as metal or polymers other than polyvinylchloride, for example, a fiber-reinforced plastic.

The over molding 20 is preferably injection molded or co-molded about the cylindrical liner 18 in a second step of a molding process. The over molding is made from a relatively low durometer, anti-skid, relatively elastic material such as naturally grown or synthetically manufactured rubber or sponge rubber. During injection molding of the over molding elastomer 20, a lengthwise segment of the cylindrical liner 18 between the annular flange 48 and the arcuate flange 42 is coated with the over molding and the over molding is allowed to flow into the elongate slots 28 within the lengthwise segment of the cylindrical liner 18. The over molding is bound to the cylindrical liner 18 to prevent relative movement therebetween. As is well known in the art, the over molding elastomer is preferably textured to enhance gripability.

Figure 1:
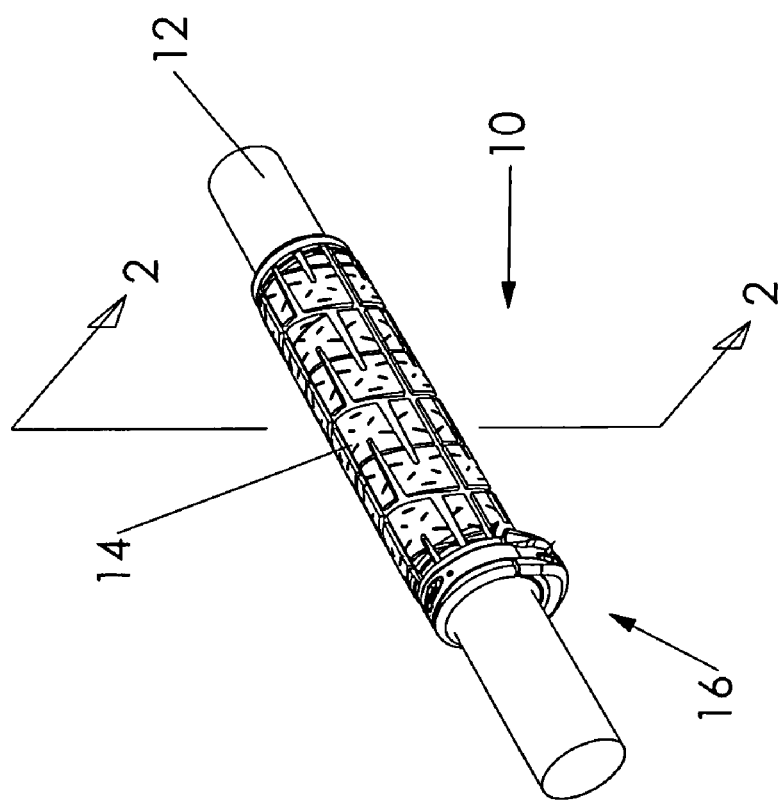
FIG. 1 is a perspective view of a cycle grip in accordance with the present invention mounted on a cycle handlebar.

The compression member 16 consists of a clamp shroud, 52, a band clamp 54, a threaded cross dowel 56, a non-threaded cross dowel 58 and a screw 62. The clamp shroud 52 has an arcuate bottom 64 having an inner radius slightly smaller than an outer radius of the arcuate recess 44. As best seen in FIG. 1, the arcuate bottom 64 is configured to nest in the arcuate recess 44. Referring back to FIG. 3, the clamp shroud 52 also includes a cavity 66 which is configured to receive the first and second ends of the band clamp 54 in a manner that will be described in greater detail below. The clamp shroud extends radially opposite the arcuate bottom 64 to form a slip guard 67.

The band clamp 54 has a first end 68 and a second end 70. The first end 68 has a pair of straps configured to receive arcuate shoulders 72 of the threaded cross dowel 56. Similarly, the second end 70 has a pair of straps configured to receive the shoulders 74 of the non-threaded cross dowel 58. The band clamp is preferably made of a resilient metal to bias the first and second axes 68, 70 apart to define a gap 75 therebetween.

When the compression member 16 is assembled the arcuate bottom 64 of the clamp shroud 52 nests in the arcuate recess 44 and the band clamp 54 is received in the arcuate channel 38 which remains exposed when the clamp shroud is in place. The first and second ends of the band clamp 68, 70 are received in the cavity 66 of the clamp shroud 52. The screw 62 is then axially received through the non-threaded cross dowel 58 and threadably engages the threaded cross dowel 56. When the screw 56 is tightened so that its head engages the non-threaded cross dowel 58 at the second end 70 of the band clamp 54, the gap 75 between the band clamp ends is biased closed to produce a compressed state of the compression member. With a handlebar axially received in the cylindrical body 14, the cycle grip 10 can then be rigidly affixed to the handlebar by compressing the first elongate slot 34. Loosening the screw 62 allows the gap between the first and second ends to be biased open by the resilient nature of the band clamp 54 and leads to a relaxed state allowing removal of the cycle grip from a handlebar.

With the assembled cycle grip attached to a handlebar as described above, the single compression member 16 rigidly affixes the cycle grip to the handlebar. If the handlebar is slightly out of specification so that it has a larger than standard diameter, the overlapping position of the elongate slots 28 allows for some radial expansion of the inner diameter of the cycle grip. Once the cycle grip is clamped into place, however, the cylindrical liner material between the elongate slots 28 enables the cylindrical liner to resist torsional deformation or twisting upon application of torsional forces such as when a user applies a torque to the cycle grip about the axis 22.

The cycle grip of the present invention can be manufactured of conventional materials using conventional injection molding and over molding techniques, yet it provides a grip which can be firmly secured to a handlebar using only a single clamp. Use of a single clamp not only simplifies attachment and removal of the cycle grip, but also reduces the weight of the cycle grip. Furthermore, use of only a single clamp renders it easier for a user to remove and replace worn grips, thereby facilitating user safety.

What is claimed is:

1. A grip device for a cycle comprising:
a cylindrical liner extending along a liner axis between a first end and a second end, the cylinder liner having at least two elongate slots extending axially along a lengthwise portion of the cylindrical liner, each elongate slot overlapping a lengthwise part of another elongate slot; the overlapping elongate slots being radially offset, a first elongate slot of the plurality of elongate slots intersecting the first end of the cylindrical liner;
an over molding overlying a lengthwise segment of the cylindrical liner; and
a compression member operatively associated with a circumference of an axial segment of the cylindrical liner, the axial segment being proximate the first end of the cylinder and including a lengthwise portion of the first elongate slot, the compression member being operable between a relaxed state not compressing the axial segment and a compression state compressing the axial segment about its circumference,
the compression member including a clamp shroud having arcuate bottom having an inner radius less than an outer radius of the axial segment, the arcuate bottom overlying the first elongate slot, and a band clamp sized to axially receive the clamp shroud and an exposed portion of the axial segment, the band clamp having a gap between band clamp ends bridged by a screw threadably engaging one end of the band clamp with a head of the screw abutting the other end of the band clamp to bias the gap closed when the screw is tightened to produce the compressed state.

2. The grip device of claim 1 wherein the cylindrical liner has a first set of at least two elongate slots extending along a first axial line and a second set of at least two elongate slots extending along a second axial line, the first and second axial lines being radially offset and the first set of elongate slots overlapping the second set of elongate slots.

3. The grip device of claim 1 further comprising a second elongate slot intersecting the second end of the cylindrical liner.

4. The grip device of claim 1 wherein the clamp shroud extends radially opposite the arcuate bottom to form a slip guard.

5. The grip device of claim 4 wherein the clamp shroud defines a cavity in the slip guard sized to receive the clamp ends and a head of the screw when the screw is tightened to produce the compressed state.

6. The grip device of claim 1 wherein the over molding fills the elongate slots.

7. The grip device of claim 1 wherein the over molding is an elastomer.

8. The grip device of claim 1 wherein the liner is made of a rigid polymer.

9. A grip device for a cycle comprising:
a cylindrical liner extending along a liner axis between a first end and a second end, the cylindrical liner having a plurality of elongate slots extending axially therein, the plurality of elongate slots being disposed to permit radial expansion of the cylindrical liner upon application of a radial force to the inner diameter of the cylindrical liner and to resist torsional displacement of the cylindrical liner upon application of a torsional force to the cylindrical liner, a first elongate slot of the plurality of elongate slots intersecting the first end of the cylindrical liner;
a compression member operatively associated with a circumference of an axial segment of the cylindrical liner, the axial segment being proximate the first end of the liner and including a lengthwise portion of the first elongate slot the compression member being operable between a relaxed state not compressing the axial segment and a compression state compressing the axial segment about its circumference,
the compression member including a clamp shroud having an arcuate bottom having an inner radius less than an outer radius of the axial segment, the arcuate bottom overlying the first elongate slot and a resilient band clamp sized to axially receive the clamp shroud and an exposed portion of the axial segment, the resilient band clamp being biased to form a gap between band clamp ends, the band clamp ends being bridged by a screw threadably engaging one end of the band clamp with a head of the screw abutting the other end of the band clamp to bias the gap closed when the screw is tightened to produce the compressed state and allow the gap open when the screw is loosened to produce the relaxed state; and
an elastomer over molding overlying a lengthwise segment of the cylindrical liner.

10. The grip device of claim 9 wherein the elongate slots are disposed with a first set of at least two elongate slots extending along a first axial line and a second set of at least two elongate slots extending along a second axial line, the first and second axial lines being radially offset and the first set of elongate slots overlapping the second set of elongate slots.

11. The grip device of claim 9 wherein the over molding fills the elongate slots.

12. The grip device of claim 9 wherein the cylindrical liner is made of a rigid polymer.

\* \* \* \* \*